April 5, 1960

J. D. SMITH ET AL 2,931,157

POWER DRIVEN MANUALLY GUIDED LAWN MOWER

Filed June 14, 1957

INVENTOR.
JOSEPH D. SMITH,
FRANK HART,
BY

McMorrow, Berman + Davidson
ATTORNEYS.

2,931,157
POWER DRIVEN MANUALLY GUIDED LAWN MOWER

Joseph D. Smith and Frank Hart, Shreveport, La.

Application June 14, 1957, Serial No. 665,705

2 Claims. (Cl. 56—25.4)

This invention relates to mowing devices, and more specifically, the present invention pertains to power driven, manually guided lawn mowers.

One of the primary objects of this invention is to provide a power driven lawn mower with means for collecting the cuttings of grass immediately subsequent to the cutting thereof.

Another object of this invention is to provide a power driven lawn mower with a receptacle for collecting and retaining the cuttings of grass.

A further object of this invention is to provide a power driven lawn mower having a rotatable cutting blade and fan blade disposed within a housing having a receptacle connected at one end thereof, the arrangement of the cutting and fan blades being such as to force the grass cuttings through the housing and into the receptacle for collection therein.

This invention contemplates, as a still further object thereof, the provision of a lawn mowing machine in which the blade or blades are arranged to move in a substantially horizontal cutting plane, together with an air-impelling blade to force the grass cuttings through the housing and into a receptacle.

It is a still further object of this invention to provide a mowing machine of the type described, the machine being non-complex in construction and assembly, and relatively inexpensive to manufacture, and durable in use.

Other and further objects and advantages of the present invention will become more evident from a consideration of the following specification when read in conjunction with the annexed drawings, in which.

Figure 1:
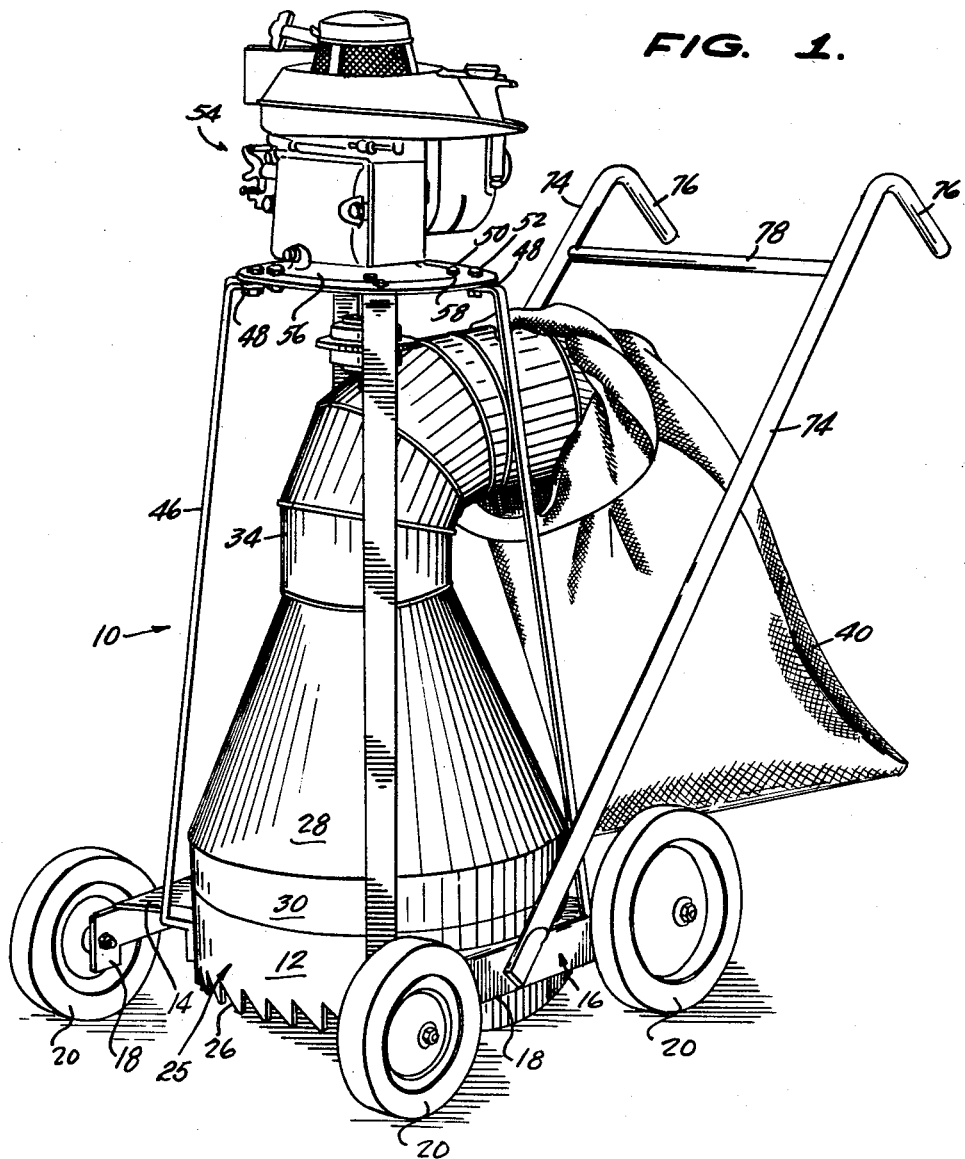
Figure 1 is a perspective view of a mowing machine constructed in accordance with the teachings of this invention.
Figure 2:
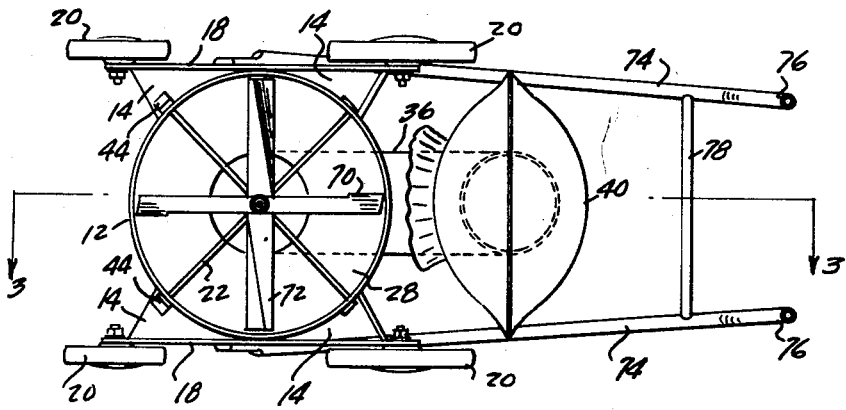
Figure 2 is a bottom plan view of the machine illustrated in Figure 1.

Referring now more specifically to the drawings, reference numeral 10 designates, in general, a mowing machine constructed in accordance with this invention. As illustrated in the drawings, the mowing machine 10 is seen to comprise a substantially hollow cylindrical main body portion 12 having a pair of opposed open ends 12A and 12B, and to the opposite sides of the main body portion are secured a pair of flanges 14 of an angle iron bracket designated at 16, each of the brackets 16 being provided with a depending flange 18 to the opposite ends of which are rotatably mounted the wheels 20.

A spider 22 having an apertured boss 24 is disposed within the cylindrical main body portion 12 adjacent the upper end thereof, and the lower forwardly facing portion 25 of the cylindrical main body is provided with a plurality of openings 26.

Figure 3:
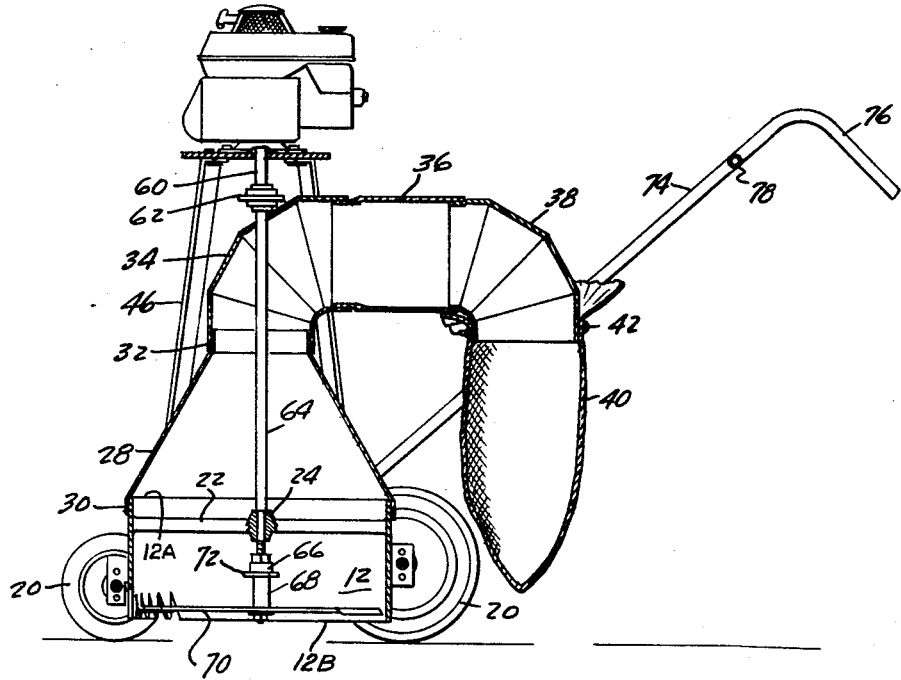
Figure 3 is a detailed cross-sectional view taken substantially on the horizontal plane of line 3—3 of Figure 2, looking in the direction of the arrows.

The lower end of a substantially frusto-conical element 28 terminates in the flange 30 which is telescoped over the upper end 12A of the cylindrical main body 12 and is fixedly connected thereto by any conventional means. The upper end of the frustoconical element 28 continues into a substantially hollow cylindrical sleeve 32 over which is telescoped one end of an elongated substantially hollow cylindrical elbow 34. As is seen in Figure 3 of the drawings, one end of an elongated substantially hollow cylindrical conduit 36 is telescoped into the other end of the elbow 34. One end of a second hollow substantially cylindrical elbow 38 having oppositely disposed open ends is telescoped within the other end of the conduit 36 and the open end of a substantially hollow receptacle 40 engages around the other end of the elbow 38 and is releasably secured thereto by means of a resilient strap or band 42.

The lower ends 44 of a plurality of upright braces 46 are fixedly secured to the main body portion 12, and the upper ends thereof terminate in inwardly bent flanges 48 on which is supported a substantially circular disc 50. Bolts 52 fixedly connect the disc 50 to the flanges 48. A conventional internal combustion engine 54 having a mounting flange 56 is secured to the disc 50 by bolts 58.

The disc 50 is centrally apertured to permit the passage therethrough of the motor drive shaft 60. Conventional coupling means 62 connects the upper end of the mower drive shaft 64 with the motor drive shaft 60. As is seen in the drawings, the mower drive shaft 64 extends downwardly through the elbow 34 and is rotatably journaled in the apertured boss 24. The lower end of the mower drive shaft 64 connects through a friction clutch 66 with a stub axle 68 carrying the cutter blade 70 and the fan blade 72. From Figure 3 it is seen that the fan blade 72 is disposed in vertically spaced relation with respect to the cutting blade 70.

The lower ends of a pair of elongated tubular handle members 74 are rigidly secured to the flanges 18 and the upper ends thereof terminate in laterally bent hand gripping sections 76. Rigidity is given to the handle members 74 by means of the spacer rod 78 which extends transversely therebetween and is rigidly secured thereto.

In the above specification it is to be understood that the cutting blade 70 and the fan blade 72 are so arranged and constructed so as to form a single unit.

The mowing machine 10 as described herein employs a high speed motor 54 directly connected to the cutting blade 70 and the fan blade 72. This insures that the grass cuttings will be picked up immediately after having been severed by the cutting blade 70 and before they can return to the ground, the fan blade 72 creating an air stream having sufficient force to pass the cuttings through the cylindrical main body portion 12, the frustoconical element 28, the elbow 34, the conduit 36, and the elbow 38 into the receptacle 40. The receptacle 40 is, of course, made of any suitable inexpensive fabric material which will permit the air to pass easily therethrough.

Having described and illustrated one embodiment of this invention, it will be understood that the same is offered merely by way of example, and that this invention is to be limited only by the scope of the appended claims.

What is claimed is:

1. A mowing machine having a substantially hollow cylindrical main body having a pair of opposed open ends, a plurality of wheels, means fixedly connecting said wheels to said body, a substantially hollow frusto-conical element having one of its ends fixedly secured to one end of said body, an elbow having one of its ends fixedly secured to the other end of said frusto-conical element, a substantially hollow conduit having one of its ends telescoped within the other end of said elbow, a second elbow having a pair of opposite open ends, said second elbow having one of its ends fixedly secured to the other end of said conduit, the other end of said second elbow being adapted for connection with a receptacle, means rigidly supporting a motor above said first elbow, a mowing blade disposed adjacent the other end of said body, a fan blade disposed adjacent said other end of said body in vertically spaced relation relative to said mowing blade, said mowing and fan blades being connected to rotate as a unit within said body, and driving means driven by said motor and extending through said elbow, said frusto-conical element and into said body for connection with said fan and mowing blades to effect the rotation thereof.

2. A mowing machine as defined in claim 1, wherein said driving means is supported on said body above said first elbow and comprises a motor, and said motor having the drive shaft thereof extending to said first elbow, said frusto-conical element and into said body for connection with said unit.

References Cited in the file of this patent

UNITED STATES PATENTS

| | | |
|---|---|---|
| 1,336,257 | Muzzy | Apr. 6, 1920 |
| 2,539,779 | Grosso | Jan. 30, 1951 |
| 2,651,530 | Blydenburgh | Sept. 8, 1953 |
| 2,725,702 | Ross | Dec. 6, 1955 |
| 2,766,573 | Shewmon | Oct. 16, 1956 |
| 2,777,270 | Colclazier | Jan. 15, 1957 |
| 2,779,146 | Mitchell et al. | Jan. 29, 1957 |
| 2,783,604 | Cahill | Mar. 5, 1957 |
| 2,789,408 | Bloxham | Apr. 23, 1957 |
| 2,807,126 | Bennett | Sept. 14, 1957 |
| 2,809,389 | Collins et al. | Oct. 15, 1957 |

FOREIGN PATENTS

| | | |
|---|---|---|
| 501,222 | Great Britain | Feb 23, 1939 |